United States Patent
Jaradi et al.

(10) Patent No.: US 12,208,765 B1
(45) Date of Patent: Jan. 28, 2025

(54) VEHICLE AIRBAG ASSEMBLY

(71) Applicant: Ford Global Technologies, LLC, Dearborn, MI (US)

(72) Inventors: Dean M. Jaradi, Macomb, MI (US); Zhenyan Gao, Northville, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/458,265

(22) Filed: Aug. 30, 2023

(51) Int. Cl.
| | |
|---|---|
| *B60R 21/205* | (2011.01) |
| *B60R 21/0134* | (2006.01) |
| *B60R 21/015* | (2006.01) |
| *B60R 21/217* | (2011.01) |
| *B60R 21/233* | (2006.01) |

(Continued)

(52) U.S. Cl.
CPC ...... *B60R 21/2338* (2013.01); *B60R 21/0134* (2013.01); *B60R 21/01542* (2014.10); *B60R 21/01554* (2014.10); *B60R 21/205* (2013.01); *B60R 21/217* (2013.01); *B60R 21/233* (2013.01); *B60R 2021/0032* (2013.01); *B60R 2021/0034* (2013.01); *B60R 2021/01245* (2013.01); *B60R 2021/0273* (2013.01); *B60R 2021/23169* (2013.01);

(Continued)

(58) Field of Classification Search
CPC . B60R 21/205; B60R 21/2338; B60R 21/217; B60R 21/233; B60R 21/0134; B60R 21/01542; B60R 21/01512; B60R 21/015; B60R 21/231; B60R 21/20; B60R 21/01554; B60R 21/203; B60R 21/16; B60R 2021/23386; B60R 2021/01245; B60R 2021/0034; B60R 2021/0273; B60R 2021/0093; B60R 2021/23308; B60R 2021/23169; B60R 2021/23107; B60R 2021/0032; B60R 2021/0051; B60R 2021/0053; B60R 2021/23324; B64D 2201/00; B64D 11/06205; B62D 1/183
USPC ...... 280/728.1, 728.2, 729, 731, 732, 743.1, 280/743.2; 701/45
See application file for complete search history.

(56) References Cited

U.S. PATENT DOCUMENTS

| | | | | |
|---|---|---|---|---|
| 2,322,755 | A | * 6/1943 | Voorhies | B60R 21/02 280/751 |
| 2,654,616 | A | * 10/1953 | Mockli | B60R 21/02 280/751 |

(Continued)

OTHER PUBLICATIONS

Wood, "Dual contour airbag for autonomous vehicles unveiled by ZF Lifetec", https://www.autonomousvehicleinternational.com/news/safety/dual-contour-airbag-for-avs-unveiled-by-zf-lifetec.html#:~:text= The airbag is designed to . . . 1/7.

*Primary Examiner* — Keith J Frisby
(74) *Attorney, Agent, or Firm* — Frank A. MacKenzie; Brooks Kushman P.C.

(57) ABSTRACT

A vehicle includes a body defining a passenger cabin with a front end, the body having a bulkhead at the front end of the passenger cabin. The vehicle includes a telescoping member supported by the bulkhead and movable from a stowed position to a deployed position. The vehicle includes an airbag supported by the telescoping member and movable from the stowed position to the deployed position, the airbag inflatable from an uninflated position to an inflated position.

20 Claims, 6 Drawing Sheets

(51) Int. Cl.
 *B60R 21/2338* (2011.01)
 *B60R 21/00* (2006.01)
 *B60R 21/01* (2006.01)
 *B60R 21/02* (2006.01)
 *B60R 21/231* (2011.01)

(52) U.S. Cl.
 CPC ......... *B60R 2021/23308* (2013.01); *B60R 2021/23324* (2013.01); *B60R 2021/23386* (2013.01)

(56) References Cited

U.S. PATENT DOCUMENTS

| | | | | |
|---|---|---|---|---|
| 2,743,942 | A * | 5/1956 | Walters | B60R 21/02 280/753 |
| 2,749,143 | A * | 6/1956 | Chika | B60R 21/02 280/751 |
| 2,781,203 | A * | 2/1957 | Kurilenko | B60R 21/02 188/297 |
| 2,801,866 | A * | 8/1957 | Naslund | B60R 21/02 280/748 |
| 3,105,702 | A * | 10/1963 | Larson | B60R 21/02 280/752 |
| 3,715,130 | A * | 2/1973 | Ikuo | B60R 21/20 280/751 |
| 3,893,703 | A * | 7/1975 | Chika | B60R 21/02 280/753 |
| 3,938,825 | A * | 2/1976 | Boswell | B60R 21/33 280/753 |
| 3,985,374 | A * | 10/1976 | Powaska | B60N 3/004 248/240.4 |
| 4,023,643 | A * | 5/1977 | Bagley, Jr. | B60R 21/02 180/282 |
| 4,951,963 | A * | 8/1990 | Behr | B60R 21/02 280/752 |
| 5,131,681 | A * | 7/1992 | Wetzel | B60R 21/02 280/801.1 |
| 5,240,283 | A | 8/1993 | Kishi | |
| 6,283,508 | B1 * | 9/2001 | Nouwynck | B60R 21/02 280/753 |
| 6,616,177 | B2 | 9/2003 | Thomas et al. | |
| 6,910,558 | B2 * | 6/2005 | Wang | B60R 19/40 188/300 |
| 6,918,611 | B1 | 7/2005 | Winters et al. | |
| 7,159,901 | B2 * | 1/2007 | Wang | B60R 21/045 280/752 |
| 7,207,598 | B2 * | 4/2007 | Tajima | B60R 21/045 280/752 |
| 7,328,916 | B2 * | 2/2008 | Tajima | B60R 21/045 280/753 |
| 7,357,415 | B2 * | 4/2008 | Enders | B60R 21/02 280/753 |
| 9,487,177 | B2 | 11/2016 | Schneider et al. | |
| 9,908,496 | B2 | 3/2018 | Choi | |
| 10,857,966 | B2 | 12/2020 | Deng et al. | |
| 11,345,305 | B2 | 5/2022 | Fischer et al. | |
| 11,458,922 | B2 | 10/2022 | Fischer et al. | |
| 11,945,395 | B1 | 4/2024 | Farooq et al. | |
| 12,036,940 | B1 | 7/2024 | Jaradi et al. | |
| 12,071,094 | B2 | 8/2024 | Farooq et al. | |
| 2003/0184070 | A1 * | 10/2003 | Vidal | F16F 7/125 280/752 |
| 2004/0046377 | A1 * | 3/2004 | Meduvsky | B60R 21/01512 280/752 |
| 2015/0061268 | A1 * | 3/2015 | Nagasawa | B60R 21/231 280/730.1 |
| 2022/0348160 | A1 | 11/2022 | Faruque et al. | |

* cited by examiner

VEHICLE AIRBAG ASSEMBLY

BACKGROUND

A vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
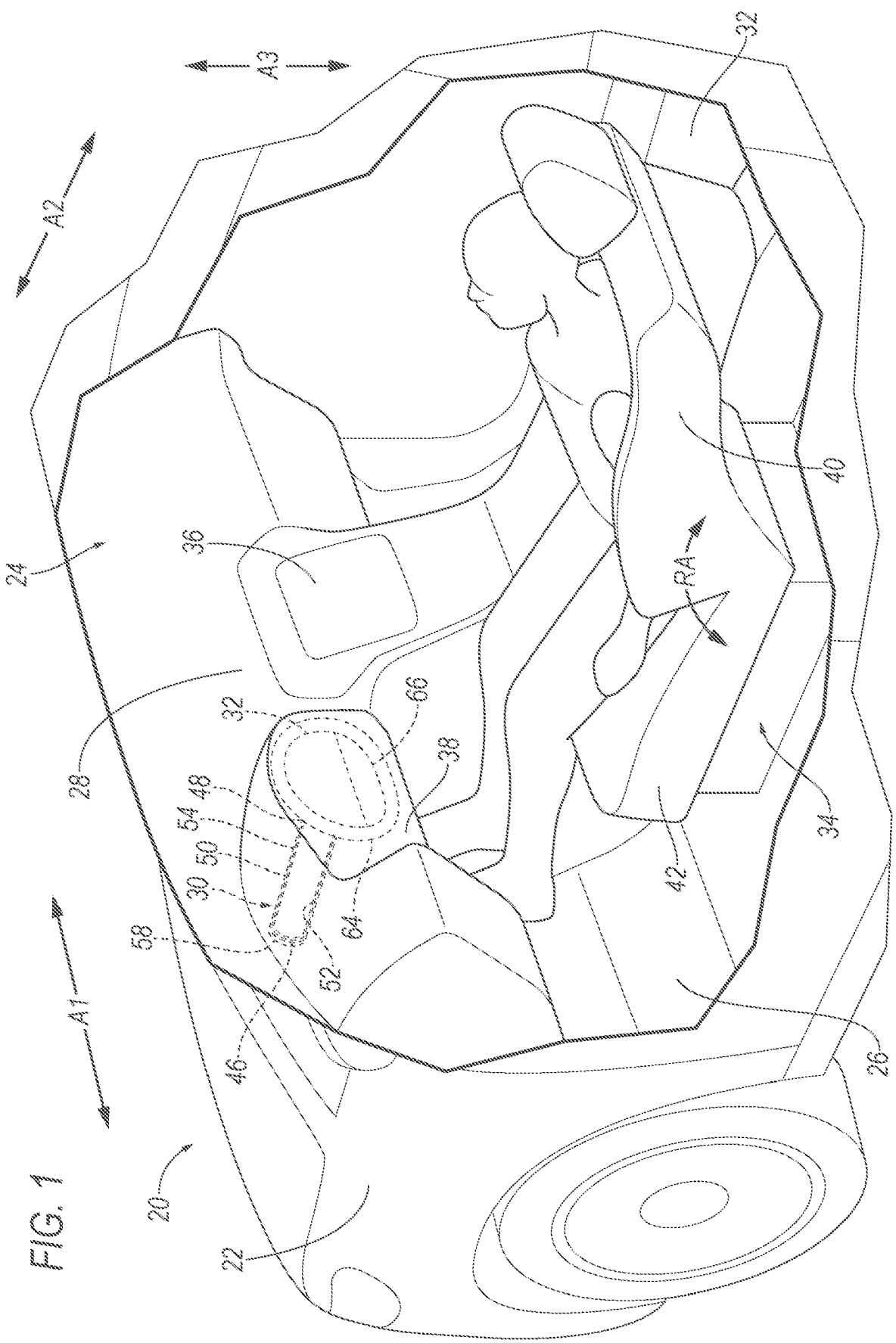
FIG. 1 is a perspective view of a portion of a vehicle broken away to show a passenger cabin with a telescoping member at a stowed position and an airbag at an uninflated position.
Figure 2:
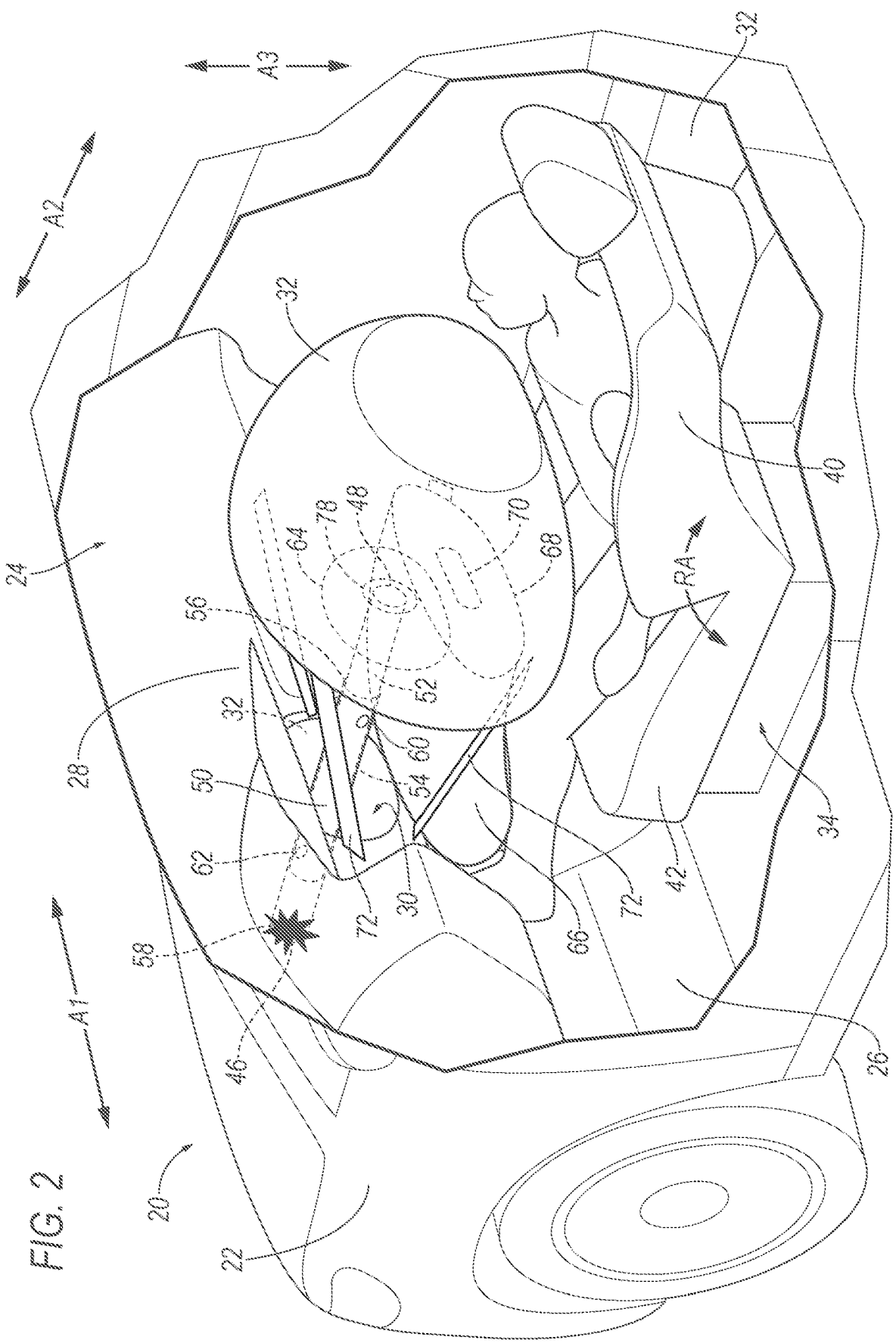
FIG. 2 is a perspective view of the portion of the vehicle broken away to show the passenger cabin with the telescoping member at a deployed position and the airbag at an inflated position.
Figure 3:
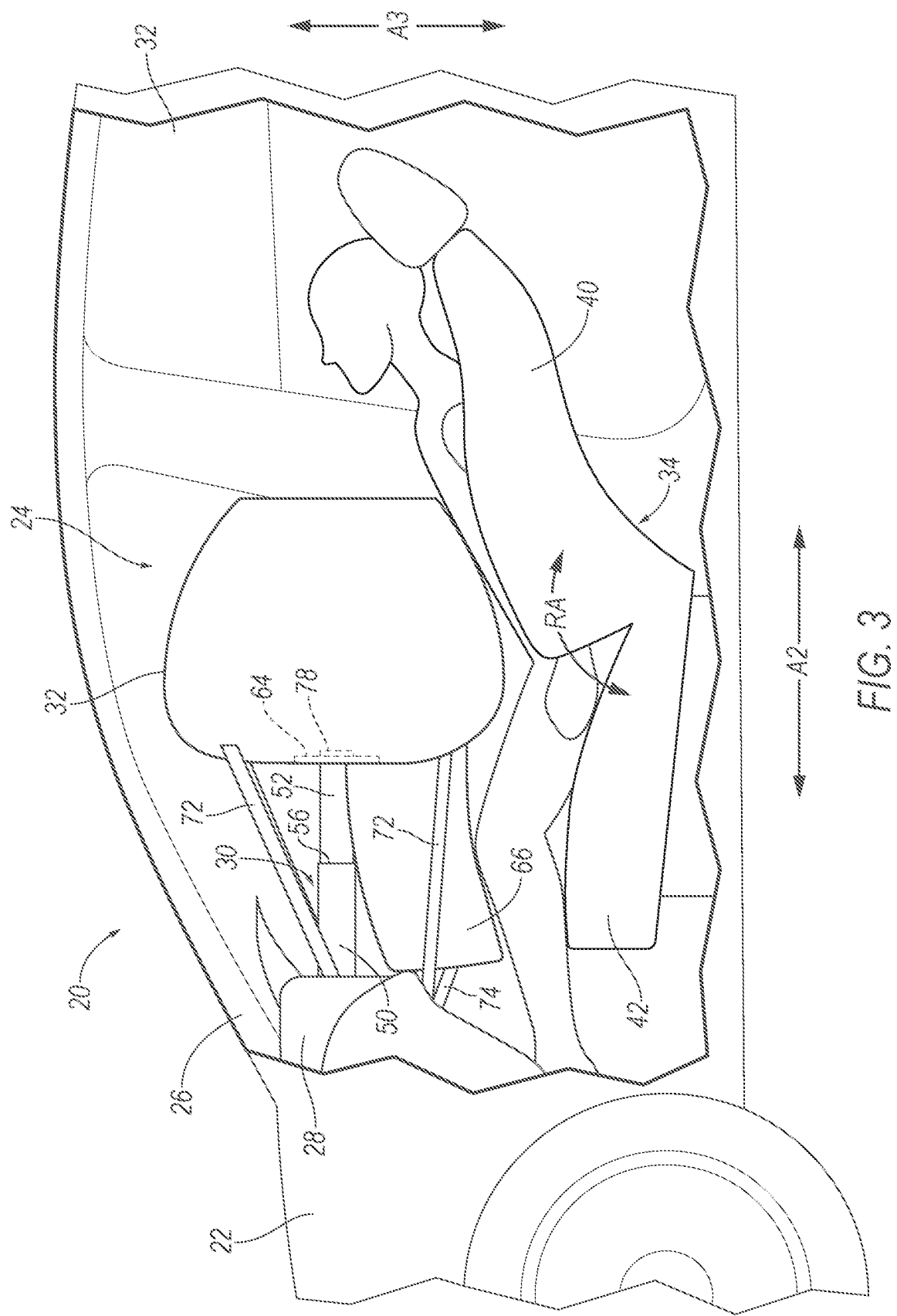
FIG. 3 is a side view of the portion of the vehicle broken away to show the passenger cabin with a seat at a recline angle above a threshold, the telescoping member at the deployed position, and the airbag at the inflated position.
Figure 4:
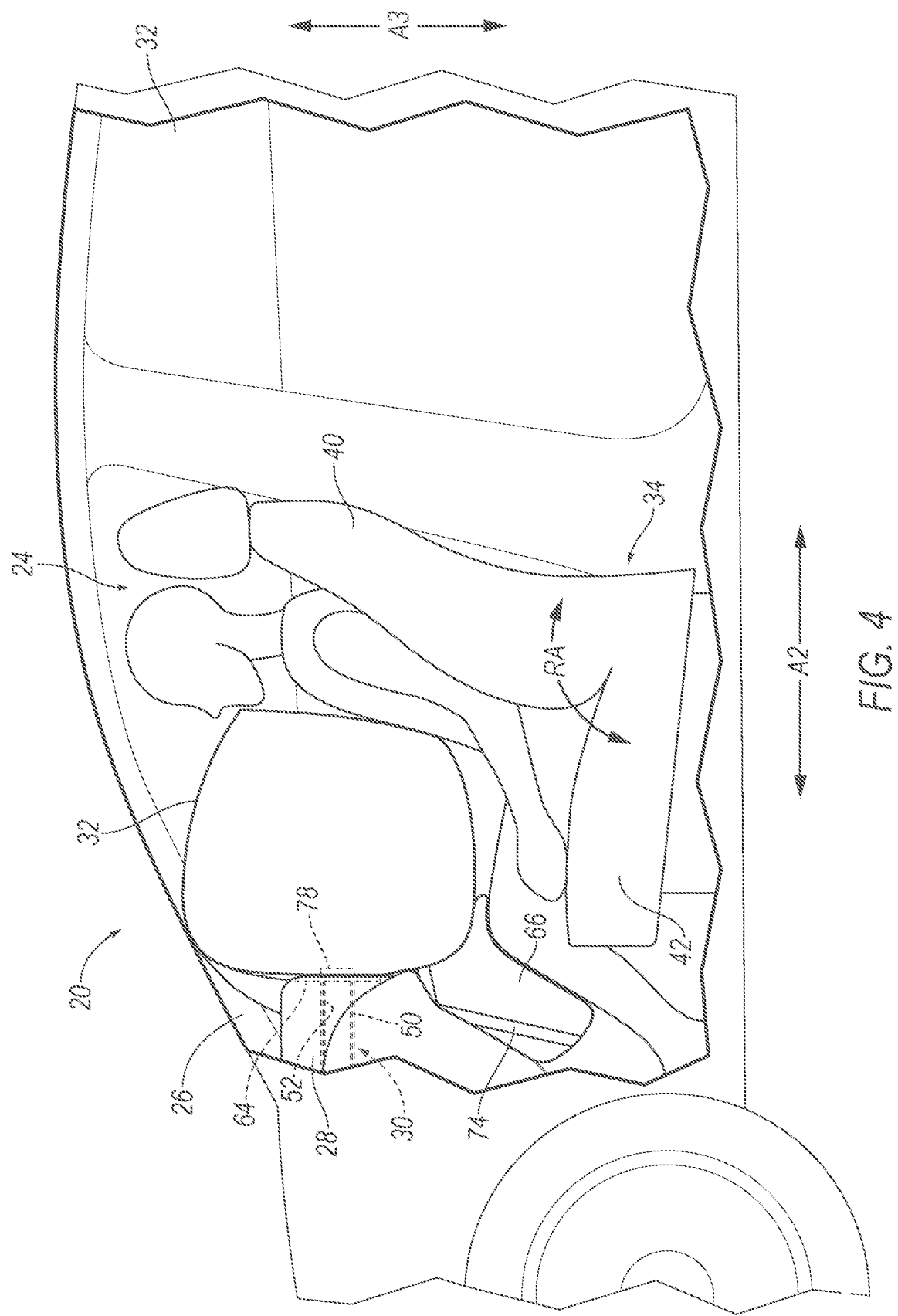
FIG. 4 is a side view of the portion of the vehicle broken away to show the passenger cabin with the seat at a recline angle below a threshold, the telescoping member at the stowed position, and the airbag at the inflated position.

A vehicle includes a body defining a passenger cabin with a front end, the body having a bulkhead at the front end of the passenger cabin. The vehicle includes a telescoping member supported by the bulkhead and movable from a stowed position to a deployed position. The vehicle includes an airbag supported by the telescoping member and movable from the stowed position to the deployed position, the airbag inflatable from an uninflated position to an inflated position.

The vehicle may include a plate supported by the telescoping member and movable from the stowed position to the deployed position, the airbag supported by the plate.

The vehicle may include an inflator supported by the plate and in fluid communication with the airbag to permit inflation medium flow from the inflator to the airbag.

The telescoping member may include a first member and a second member slidable along the first member away from the bulkhead to the deployed position.

The vehicle may include a lock configured to maintain the second member at the deployed position.

The first member may be slidable rearward from the bulkhead to the deployed position.

The vehicle may include a first lock configured to maintain the second member at the deployed position and a second lock configured to maintain the first member at the deployed position.

The airbag in the inflated position may be spaced from the bulkhead with the telescoping member at the deployed position.

The vehicle may include a tether extending from the airbag to the bulkhead.

The bulkhead may include an instrument panel.

The vehicle may include a pyrotechnic material that moves the telescoping member to the deployed position upon actuation.

The vehicle may include a second airbag inflatable to a second inflated position, the second airbag in the inflated position below the airbag in the inflated position.

The airbag may be in fluid communication with the second airbag to permit inflation medium to flow from the airbag to the second airbag.

The second airbag may extend from the airbag toward the bulkhead.

The vehicle may include a tether extending from the second airbag to the bulkhead.

The vehicle may include a computer having a processor and a memory storing instructions executable by the processor to move the telescoping member to the deployed position in response to detecting a certain impact to the vehicle.

The vehicle may include a seat assembly facing the airbag and defining a recline angle.

The vehicle may include a computer having a processor and a memory storing instructions executable by the processor to compare the recline angle of the seat assembly to a threshold recline angle, detect a certain impact to the vehicle, in response to determining that the recline angle is greater than the threshold recline angle and detecting the certain impact to the vehicle, move the telescoping member to the deployed position and inflate the airbag, and, in response to determining that the recline angle is not greater than the threshold recline angle and detecting the certain impact to the vehicle, inflate the airbag without moving the telescoping member to the deployed position.

The instructions may include instructions to inflate the airbag a threshold amount of time after moving the telescoping member to the deployed position.

With reference to the Figures, wherein like numerals indicate like parts throughout the several views, a vehicle 20 is shown. The vehicle 20 includes a body 22 defining a passenger cabin 24 with a front end 26, the body 22 having a bulkhead 28 at the front end 26 of the passenger cabin 24. The vehicle 20 includes a telescoping member 30 supported by the bulkhead 28 and movable from a stowed position to a deployed position. The vehicle 20 includes an airbag 32 supported by the telescoping member 30 and movable from the stowed position to the deployed position. The airbag 32 is inflatable from an inflated position to an inflated position.

With reference to FIGS. 1-5, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc.

In the present description, relative vehicular orientations and directions (by way of example, top, bottom, front, rear, outboard, inboard, inward, outward, forward, rearward, lateral, left, right, etc.) are from the perspective of an occupant seated in a seat assembly 34 in the vehicle 20 and facing forward, e.g., toward a forward windshield of the vehicle 20. The forward direction of the vehicle 20 is the direction of movement of the vehicle 20 when the vehicle 20 is engaged in forward drive with wheels of the vehicle 20 straight.

The vehicle 20 defines a lateral axis A1 extending between a left-side and a right-side of the vehicle 20. The vehicle 20 defines a longitudinal axis A2 extending between a front and a rear of the vehicle 20. The vehicle 20 defines a vertical axis A3 extending between a top and a bottom of the vehicle 20. The lateral axis A1, the longitudinal axis A2, and the vertical axis A3 are perpendicular relative to each other.

The vehicle 20 includes a frame and the body 22. The body 22 may be of unitary construction, in which the frame is unitary with the body 22 including frame rails, rockers, pillars, roof rails, etc. As another example, the body 22 and frame may have a body-on-frame construction (also referred to as a cab-on-frame construction) in which the body 22 (including rockers, pillars, roof rails, etc.) and frame are separate components, i.e., are modular, and the body 22 is supported on and affixed to the frame. Alternatively, the frame and body 22 may have any suitable construction. The frame and the body 22 may be of any suitable material, for example, steel, aluminum, and/or fiber-reinforced plastic, etc. The body 22 defines the passenger cabin 24 to house occupants, if any, of the vehicle 20. The passenger cabin 24 may extend across the vehicle 20, i.e., from one side to the other side of the vehicle 20. The passenger cabin 24 includes the front end 26 and a rear end.

In the example shown in the Figures, the body 22 includes one bulkhead 28 at the front end 26 of the passenger cabin 24. In another example, additionally or alternately, a bulkhead may be at the rear end of the passenger cabin 24 (not shown). In such an example, the bulkhead 28 at the front and the bulkhead at the rear may be identical or different. The bulkhead 28 is elongated along the lateral axis A1. In other words, the bulkhead 28 may be longer along the lateral axis A1 than along the longitudinal axis A2 or the vertical axis A3. The bulkhead 28 may extend from a pillar on the right-side of the vehicle 20 to a pillar on a left-side of the vehicle 20. In other words, the bulkhead 28 may extend completely across the passenger cabin 24 along the lateral axis A1. The bulkhead 28 may extend from a floor of the passenger cabin 24 to the front windshield (or rear windshield), e.g., along the vertical axis A3 of the vehicle 20.

The bulkhead 28 may include an instrument panel 36. The instrument panel 36 may include one or more instruments such as gauges, displays, a user interface, etc. The instrument panel 36 may be elongated along the lateral axis A1 from the left-side of the vehicle 20 to the right-side of the vehicle 20. The instrument panel 36 presents information to and may receive information from an occupant of the vehicle 20. The instrument panel 36 may include dials, digital readouts, screens such as a touch-sensitive display screen, speakers, buttons, knobs, keypads, microphone, and so on for providing information to, and receiving information from, the occupant. The instrument panel 36 may support vehicle controls, including a steering wheel (not shown).

The bulkhead 28 may include an outer surface 38 that faces the passenger cabin 24. The outer surface 38 may be a class-A surface, i.e., a finished surface exposed to view by a customer and free of unaesthetic blemishes and defects.

One or more seat assemblies 34 may be supported in the passenger cabin 24, e.g., by the floor of the vehicle 20. Each seat assembly 34 includes a seatback 40 and a seat bottom 42 that can support an occupant of the seat assembly 34. For example, the occupant of the seat assembly 34 may sit atop a top surface of the seat bottom 42 and recline against the seatback 40. The seatback 40 and the seat bottom 42 may be adjustable in multiple degrees of freedom. Specifically, the seatback 40 and the seat bottom 42 may themselves be adjustable, in other words, adjustable components within the seatback 40 and/or the seat bottom 42. One of the seat assemblies 34 faces the airbag 32. Such seat assembly 34 is aligned with the airbag 32 along the lateral axis A1 and spaced rearward from the airbag 32 along the longitudinal axis A2.

The seatback 40 can include a frame and a covering. The frame may include tubes, beams, etc. Specifically, the frame may include a pair of upright frame members. The upright frame members are elongated, and specifically, are elongated in a generally upright direction (e.g., along a vertical axis A3) when the seatback 40 is in a generally upright position. The upright frame members are spaced from each other along the lateral axis A1. The frame may include one or more cross-members extending between the upright frame members. The frame, including the upright frame members, may be of any suitable plastic material, e.g., carbon fiber reinforced plastic (CFRP), glass fiber-reinforced semi-finished thermoplastic composite (organoshect), etc. As another example, some or all components of the frame may be formed of a suitable metal, e.g., steel, aluminum, etc. The cover may include upholstery and padding. The upholstery may be cloth, leather, faux leather, or any other suitable material. The upholstery may be stitched in panels around the frame. The padding may be between the cover and the frame and may be foam or any other suitable material.

The seat bottom 42 can include a frame and a covering. The frame may include tubes, beams, etc. Specifically, the frame may include a pair of frame members, e.g., elongated along the longitudinal axis A2. The frame members are spaced from each other along a lateral axis A1. The frame may include cross-members extending between the frame members. The cross-members may be elongated along the lateral axis A1. The frame can include a seat pan. The seat pan may be generally planar and extend from one of the frame members to the other of the frame members, e.g., along lateral axis A1. The seat pan may be fixed to the frame members. The frame, including the frame members, the cross-members, and the seat pan may be of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the upholstery and the frame. The padding may be foam or any other suitable material. The seatback 40 is supported by the seat bottom 42 at a rear of the seat bottom 42. The seat bottom 42 extends forward from the seatback 40. The seatback 40 is movable relative to the seat bottom 42. For example, the seatback 40 may pivot about an axis that is parallel to the lateral axis A1.

The seat assembly 34 defines a recline angle RA, e.g., between the seatback 40 and the seat bottom 42. Pivoting the seatback 40 relative to the seat bottom 42 changes the recline angle RA. The recline angle RA may be an angle between the seatback 40 and the seat bottom 42. The recline angle RA may be between the seatback 40 and another datum of the vehicle 20, e.g., the vertical axis A3.

The seat assembly 34 may be adjustable between an upright position and a reclined position. Specifically, the occupant of the seat assembly 34 may selectively adjust the seat between the upright position and the recline position, for example, with the use of a human-machine interface such as a button, lever, touchscreen, etc. The telescoping member 30 is operated based upon the occupant-selected position of the seat assembly 34 to the upright position or the reclined position, as described below. The seatback 40 may be rotatable relative to the seat bottom 42 to at least one upright position and at least one reclined position. In an upright position, the seatback 40 is positioned such that an occupant is seated with their torso elongated upright, and in a reclined position, the seatback 40 is positioned such that an occupant is prone. As an example, the seatback 40 is in an upright position when the recline angle RA is between 90-135 degrees relative to the seat bottom 42 and is in a reclined position when the recline angle RA is between 135-180 degrees relative to the seat bottom 42. It is anticipated that technology and the regulatory framework may evolve in the future to where operation of a vehicle while the seat assembly 34 is in the reclined position becomes safe and permissible. In any event, operations, systems, and methods described herein should always be implemented and/or performed in accordance with an applicable owner's/user's manual and/or safety guidelines.

A threshold recline angle of the seatback 40 defines a boundary between the seatback 40 being upright and the seatback 40 being reclined. The threshold angle may, for example, depend on a forward-aft position of the seat assembly 34, a size of the occupant, etc. The threshold recline angle may be determined via crash testing, computer simulation testing, etc., that considers kinematics of the occupant at various recline angles and with the airbag 32 in the inflated position with the telescoping member 30 at the stowed position and at the deployed position.

The telescoping member 30 is included in the vehicle 20 to reposition the airbag 32 relative to the seat assembly 34, e.g., as commanded by a computer 44 of the vehicle 20 during certain impacts to the vehicle 20 when the recline angle RA of the seat assembly 34 is greater than the threshold recline angle. The telescoping member 30 is movable from the stowed position, shown in FIG. 1, to the deployed position, shown in FIGS. 2 and 3. The telescoping member 30 may define a length, e.g., between a proximate end 46 and a distal end 48, that is shorter in the stowed position than in the deployed position. The telescoping member 30 is supported by the bulkhead 28. For example, the telescoping member 30 may be fixed to the bulkhead 28 via fastener, bracket, weld, etc. The telescoping member 30 in the stowed position is internal of the bulkhead 28. For example, the telescoping member 30 in the stowed position may be forward of the outer surface 38 of the bulkhead 28 and out of view of an occupant of the passenger cabin 24. The telescoping member 30 in the deployed position is external of the bulkhead 28. For example, the telescoping member 30 in the deployed position may be rearward of the outer surface 38 of the bulkhead 28 and viewable by an occupant of the passenger cabin 24. The outer surface 38 may include tear seams, movable panels, etc., to permit movement of telescoping member 30 from the stowed position to the deployed position.

The telescoping member 30 may include one or more members 50, 52 slidable relative to each other to move from the stowed position to the deployed position. For example, the telescoping member 30 may include a first member 50 and a second member 52. The first member 50 may include a hollow cylinder surrounding a chamber 54 therein. The first member 50 may have an open end 56. The second member 52 may be in the chamber of the first member 50. For example, the first member 50 and the second member 52 may be concentric tubes with the second member 52 nested inside the first member 50. The first member 50 may be slidable rearward from the bulkhead 28 to the deployed position. For example, the first member 50 may be supported by and slidable relative to a support ring, guide tube, track, or other suitable structure of the bulkhead 28. The second member 52 may be slidable along the first member 50 away from the bulkhead 28 to the deployed position. For example, the second member 52 may extend out of the open end 56 of the first member 50 and be linearly slidable within the chamber and through the open end 56. The telescoping may include one or more additional members e.g., a third member (not shown) slidable relative to the second member 52.

Figure 5:
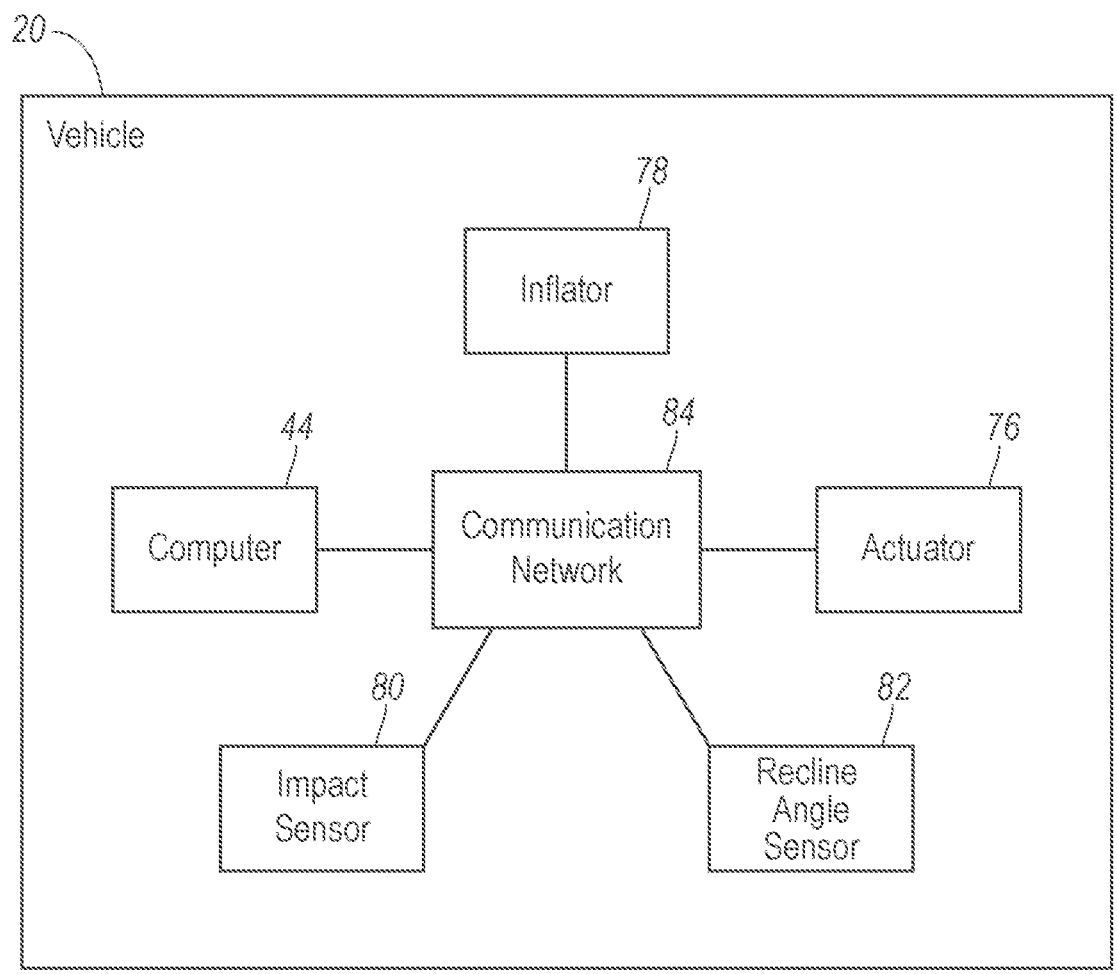
FIG. 5 is a block diagram of components of the vehicle.

The telescoping member 30 may include an actuator 76 (shown in FIG. 5). The actuator 76 may be pyrotechnically activated, i.e., with a pyrotechnic material 58 that moves the telescoping member 30 to the deployed position upon actuation. The pyrotechnic material 58 rapidly increases in volume upon actuation, e.g., in response to receiving an electrical pulse. The pyrotechnic material 58 may be combustible to produce gas. The pyrotechnic material 58 may be formed of a solid mixture of substances that, when ignited, react to produce the gas. For example, the pyrotechnic material 58 may be formed of sodium azide (NaNO3), potassium nitrate (KNO3), and silicon dioxide (SiO2), which react to form nitrogen gas (N2). The pyrotechnic material 58 may be disposed within the first member 50, e.g., in the chamber 54 and opposite the open end 56. Actuation of the pyrotechnic material 58 may urge the first member 50 and the second member 52 away from the bulkhead 28, causing the first member 50 to slide relative to the bulkhead 28 and the second member 52 to slide relative to the first member 50 to increase the length of the telescoping member 30. The vehicle 20 may include any other suitable structure for moving the telescoping member 30 to the deployed position, e.g., a linear actuator or the like.

The vehicle 20 may include one or more locks 60, 62 that maintain the telescoping member 30 at the deployed position. For example, the vehicle 20 may include a first lock 60 configured to maintain the second member 52 at the deployed position and a second lock 62 configured to maintain the first member 50 at the deployed position. Structures of the locks 60, 62, e.g., a pin, may engage the telescoping member 30 at the deployed position. For example, in the deployed position the first lock 60 may include a spring-loaded pin supported by first member 50 that engages a hole of the bulkhead 28 in the deployed position and the second lock 62 may include a spring-loaded pin supported by the second member 52 that engages a hole of the first member 50 in the deployed position. The locks 60, 62 may include any other suitable structure for maintaining the telescoping member 30 in the deployed position, e.g., latches, ratchet teeth, springs, or any suitable structure, including conventional locks.

The vehicle 20 may include a plate 64 supported by the telescoping member 30 and movable from the stowed position to the deployed position. The plate 64 provides a reaction surface for the airbag 32 in the inflated position. The plate 64 may be circular or any suitable shape. The plate 64 has an outer diameter that is wider and taller than the telescoping member 30, e.g., along the vertical axis A3 and the lateral axis A1. The plate 64 may be fixed to the telescoping member 30, e.g., to the second member 52 at the distal end 48 and via fastener, bracket, weld, etc. The plate 64 in the stowed position may be in the bulkhead 28, e.g., under the outer surface 38 and out of view of an occupant of the vehicle 20. The plate 64 in the deployed position may be outside of the bulkhead 28, e.g., spaced rearward from the bulkhead 28.

The vehicle 20 may include more than one airbag, e.g., the airbag 32 (also referred to as a "first airbag 32") and a second airbag 66, for controlling kinematics of an occupant of the vehicle 20 during certain impacts to the vehicle 20. Each of the airbags 32, 66 is inflatable from an uninflated position, shown in FIG. 1, to an inflated position, shown in FIGS. 2-4. The airbags 32, 66 may each include panels of a woven polymer, or any other suitable material, that define inflation chambers that can receive inflation medium to inflate the first airbag 32 and the second airbag 66 to the inflated positions. As one example, the first airbag 32 and the second airbag 66 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 32 is supported by the telescoping member 30, e.g., supported by the plate 64. For example, the airbag 32 may be supported by an airbag housing fixed to plate 64. The airbag 32 is movable from the stowed position to the deployed position, e.g., along with the plate 64. The airbag 32 at the stowed position, e.g., while at the uninflated position, may be within the bulkhead 28 under the outer surface 38. The airbag 32 at the deployed position (i.e., with the telescoping member 30 at the deployed position), e.g., at the uninflated position and the inflated position, may be outside of the bulkhead 28, e.g., spaced rearward from the bulkhead 28 along the longitudinal axis A2. The airbag 32 at the inflated position may control kinematics of a head and/or torso of an occupant of the seat assembly 34 during certain impacts to the vehicle 20.

The second airbag 66 may be supported by the telescoping member 30, e.g., via the plate 64. The second airbag 66 in the inflated position may be below the airbag 32 in the inflated position, e.g., along the vertical axis A3. The second airbag 66 in the inflated position may extend from the airbag 32 toward the bulkhead 28, e.g., forward along the longitudinal axis A2. The second airbag 66 at the inflated position may control kinematics of legs of the occupant of the seat assembly 34 during certain impacts to the vehicle 20. The airbag 32 may be in fluid communication with the second airbag 66 to permit inflation medium to flow from the airbag 32 to the second airbag 66. For example, a panel 68 may separate the inflation chamber of the airbag 32 from the inflation chamber of the second airbag 66. The panel 68 may include one or more openings 70 that permit fluid flow therethrough from one inflation chamber to the other.

One or more tethers 72, 74 may be included, e.g., to guide inflation of the airbags 32, 66 and support the airbags 32, 66 in the inflated positions. The tethers 72, 74 may be a woven polymer, or any other suitable material. For example, one or more first tethers 72 may extend from the airbag 32 to the bulkhead 28. The first tethers 72 may be fixed to the airbag 32 at one end and fixed to the bulkhead 28 at an opposite end. One or more second tethers 74 may extend from the second airbag 66 to the bulkhead 28. The second tethers 74 may be fixed to the second airbag 66 at one end and fixed to the bulkhead 28 at an opposite end.

The vehicle 20 may include one or more inflators 78 for inflating the first airbag 32 and the second airbag 66 to the inflated positions. The inflator 78 provides inflation medium to inflate the first airbag 32 and the second airbag 66 from uninflated positions to the inflated positions. Each inflator 78 may be, for example, a pyrotechnic inflator that uses a chemical reaction to drive inflation medium to the first airbag 32 and/or the second airbag 66. The inflators 78 may be of any suitable type, for example, a cold-gas inflator. Each inflator 78 may be in fluid communication with one or more of the first airbag 32 and/or the second airbag 66 to permit inflation medium flow from the inflator 78 to the first airbag 32 and/or the second airbag 66, e.g., directly, through various piping, etc. For example, one inflator 78 may provide inflation medium to the first airbag 32 and the second airbag 66. The inflator 78 may provide inflation medium to the first airbag 32, and the inflation medium may flow from the first airbag 32 to the second airbag 66, e.g., via the opening 70 in the panel 68. As another example, one inflator 78 may provide inflation medium to the first airbag 32 and another inflator 78 may provide inflation medium to the second airbag 66 (not shown). The inflator 78 may be supported by the plate 64, e.g., fixed to the plate 64 via fastener, bracket, etc. The plate 64 may be between the inflator 78 and the first airbag 32 and the inflator 78. For example, the inflator 78 may be forward of the plate 64 and the airbag 32 may be rearward of the plate 64 along the longitudinal axis A2.

With reference to FIG. 5, the vehicle 20 may include at least one impact sensor 80 configured to detect certain impacts to the vehicle 20, i.e., of a certain type and/or magnitude. The impact sensor 80 is configured to detect certain vehicle impacts. In other words, a "certain vehicle impact" is an impact of the type and/or magnitude for which inflation of the first airbag 32 is designed i.e., "certain" indicates the type and/or magnitude of the impact. The type and/or magnitude of such "certain vehicle impacts" may be pre-stored in the computer 44, e.g., a restraints control module and/or a body control module. The impact sensor 80 may be configured to detect certain impact contemporaneously with the certain impact and/or the impact sensor 80 may be configured to sense certain impacts prior to impact, i.e., pre-impact sensing. The impact sensor 80 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensors 80 may be located at numerous points in or on the vehicle 20.

The vehicle 20 may include a recline angle sensor 82 configured to detect the recline angle RA between the seat bottom 42 and the seatback 40. The recline angle sensor 82 may be, for example, a proximity sensor, a touch sensor, a hall effect sensor, a rotary encoder, a camera, a switch, or any other suitable sensor that can generate a signal that indicates the angle between the seat bottom 42 and the seatback 40. The recline angle sensor 82 can be supported by the seat bottom 42, the seatback 40, or any suitable structure. The recline angle sensor 82 may be in communication with the computer 44. In other words, the computer 44 may receive a signal from the recline angle sensor 82 indicating the recline angle RA between the seat bottom 42 and the seatback 40.

The vehicle 20 may include a communication network 84. The communication network 84 includes hardware, such as a communication bus, for facilitating communication among vehicle components, e.g., the computer 44, the pyrotechnic material 58, the impact sensor 80, the recline angle sensor 82, the inflator 78, etc. The communication network 84 may facilitate wired or wireless communication among the vehicle 20 components in accordance with a number of communication protocols such as controller area network (CAN), Ethernet, WiFi, Local Interconnect Network (LIN), and/or other wired or wireless mechanisms. Alternatively or additionally, in cases where the computer 44 comprises a plurality of devices, the communication network 84 may be used for communications between devices represented as the computer 44 in this disclosure.

The computer 44 may be a microprocessor-based computer implemented via circuits, chips, or other electronic components. The computer 44 includes a processor, a memory, etc. The memory of the computer 44 may include memory for storing programming instructions executable by the processor as well as for electronically storing data and/or databases. For example, the computer 44 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 44 may be a restraints control module. In another example, computer 44 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 44. The memory can be of any type, e.g., hard disk drives, solid state drives, servers, or any volatile or non-volatile media. The memory can store the collected data sent from the sensors.

The computer 44 is programmed to, i.e., the memory stores instructions executable by the processor to, detect a certain impact to the vehicle 20. The computer 44 may detect the certain impact to the vehicle 20 based on information received from the impact sensors 80, e.g., received via the communication network 84.

The computer 44 is programmed to detect the recline angle RA of the seat assembly 34. The computer 44 may detect the recline angle RA based on information received from the recline angle sensor 82, e.g., received via the communication network 84.

The computer 44 is programmed to compare the recline angle RA of the seat assembly 34, e.g., detected with the recline angle sensor 82, to the threshold recline angle RA. The threshold recline angle may be pre-stored in the memory of the computer.

The computer 44 is programmed to move the telescoping member 30 to the deployed position. The computer 44 may move the telescoping member 30 to the deployed position by instructing the actuator 76, e.g., by commanding a pulse to the pyrotechnic material 58, via the communication network 84.

The computer 44 is programmed to inflate the airbags 32, 66 to the inflated positions. The computer 44 may inflate the airbags 32, 66 by commanding a pulse to the inflator 78, e.g., via the communication network 84.

Figure 6:
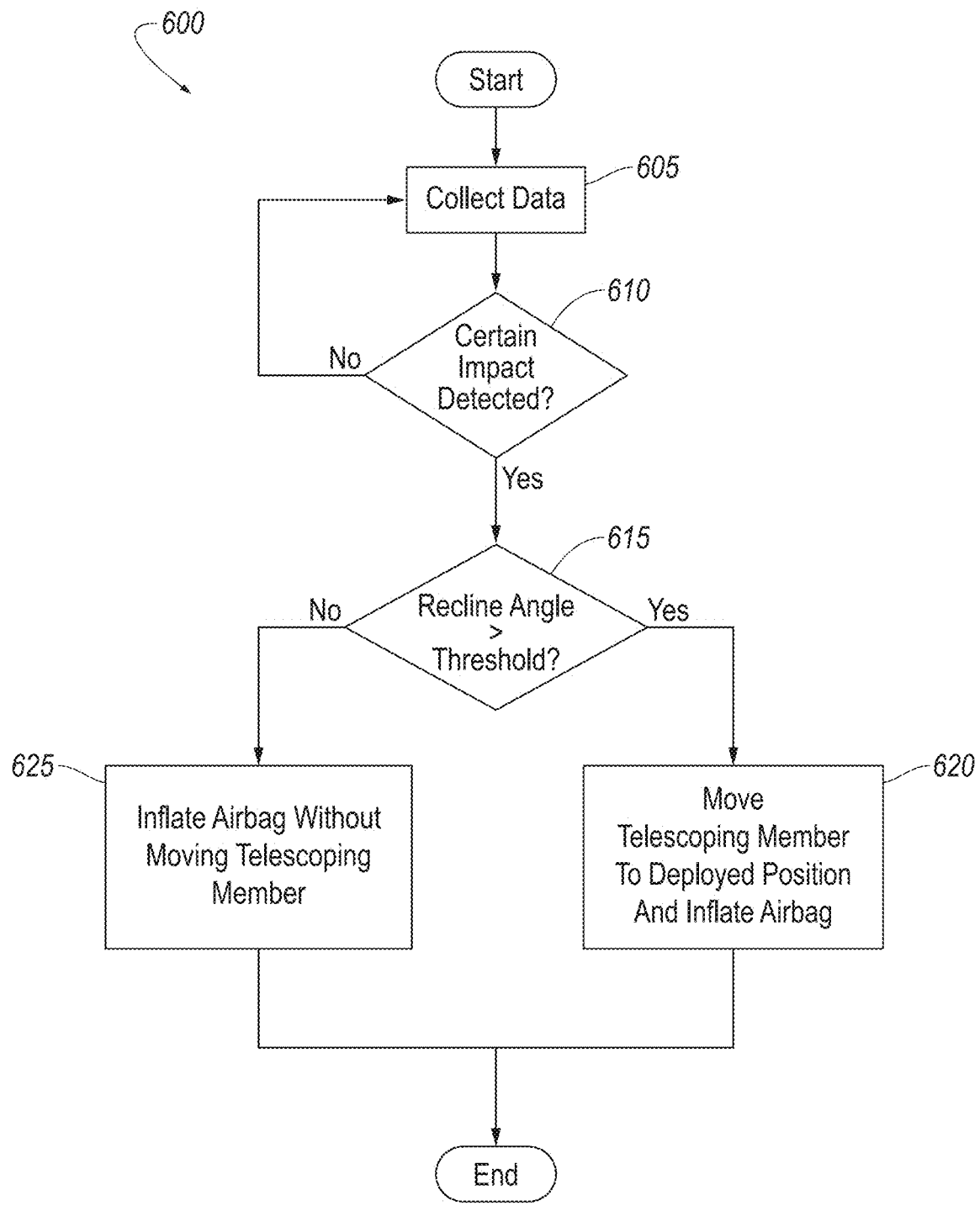
FIG. 6 is a flow chart showing a process for controlling the telescoping member and the airbag.

FIG. 6 is a process flow diagram illustrating an exemplary process 600 for controlling the movement of the telescoping member 30 and inflation of the airbag 32 and the second airbag 66. The process 600 may be performed by the computer 44. In other words, the memory of the computer 44 may store instructions executable by the processor to perform the process 600. The telescoping member 30 is at the stowed position, and the airbag 32 is at the uninflated position, when the process 600 begins. The process 600 begins in a block 605, in which the computer 44 collects data, e.g., received from the recline angle sensor 82, the impact sensor 80, etc., e.g., via the communication network 84. The computer 44 may continue to receive data throughout the process 600. Throughout the process 600 in the present context means substantially continuously or at time intervals, e.g., every 10 milliseconds. The computer 44 may store the collected data, as well as other determinations, detections, commands, etc., received, performed, or transmitted throughout the process 600. The telescoping member 30 may initially be at the stowed position and the airbags 32, 66 may initially be at the uninflated positions when the process 600 starts and at the block 605.

Next at a block 610 the computer 44 determines whether a certain impact to the vehicle 20 has been detected, e.g., based on information received from the impact sensor 80. In response to determining the certain potential impact to the vehicle 20 has been detected, the computer 44 moves to a block 615. In response to determining the certain impact has not been detected, the computer 44 returns to the block 605.

At the block 615 the computer 44 determines whether the recline angle RA is greater than the threshold recline angle, e.g., by comparing information received from the recline angle sensor 82 indicating the recline angle RA with the threshold recline angle. In response to determining the recline angle RA is greater than the threshold recline angle the computer 44 moves to a block 620. In response to determining the recline angle RA is not greater than the threshold recline angle the computer 44 moves to a block 625.

At the block 620, i.e., in response to determining that the recline angle RA is greater than the threshold recline angle and detecting the certain impact to the vehicle 20, the computer 44 moves the telescoping member 30 to the deployed position and inflates the airbags 32, 66, e.g., by transmitting a pulse to the pyrotechnic material 58 and a pulse to the inflator 78. The computer 44 may inflate the airbags 32, 66 a threshold amount of time after moving the telescoping member 30 to the deployed position. For example, the computer 44 may command the pulse to the inflator 78 the threshold amount of time after commanding the pulse to the pyrotechnic material 58. The threshold amount of time is an amount of time sufficient to permit movement of the telescoping member 30 to the deployed position, e.g., such that the locks 60, 62 can maintain the telescoping member 30 at the deployed position when the airbags 32, 66 are inflated. After the block 620 the process 600 may end.

At the block 625, i.e., in response to determining that the recline angle RA is not greater than the threshold recline angle and detecting the certain impact to the vehicle 20, the computer 44 inflates the airbags 32, 66 without moving the telescoping member 30 to the deployed position, e.g., by transmitting a pulse to the inflator 78 and not transmitting a pulse to the pyrotechnic material 58. After the block 625 the process 600 may end.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

Computing devices, such as the computer 44, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer 44 can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The numerical terms "first" and "second," including with respect to the first airbag 32 and the second airbag 66, are used herein merely as identifiers and do not signify order or importance. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
a body defining a passenger cabin with a front end, the body having a bulkhead at the front end of the passenger cabin;
a telescoping member supported by the bulkhead and movable from a stowed position to a deployed position;
an airbag supported by the telescoping member and movable from the stowed position to the deployed position, the airbag inflatable from an uninflated position to an inflated position;
a seat assembly facing the airbag and defining a recline angle; and
a computer having a processor and a memory storing instructions executable by the processor to:
compare the recline angle of the seat assembly to a threshold recline angle;
detect a certain impact to the vehicle;
in response to determining that the recline angle is greater than the threshold recline angle and detecting the certain impact to the vehicle, move the telescoping member to the deployed position and inflate the airbag; and
in response to determining that the recline angle is not greater than the threshold recline angle and detecting the certain impact to the vehicle, inflate the airbag without moving the telescoping member to the deployed position.

2. The vehicle of claim 1, further comprising a plate supported by the telescoping member and movable from the stowed position to the deployed position, the airbag supported by the plate.

3. The vehicle of claim 2, further comprising an inflator supported by the plate and in fluid communication with the airbag to permit inflation medium flow from the inflator to the airbag.

4. The vehicle of claim 1, wherein the telescoping member includes a first member and a second member slidable along the first member away from the bulkhead to the deployed position.

5. The vehicle of claim 4, further comprising a lock configured to maintain the second member at the deployed position.

6. The vehicle of claim 4, wherein the first member is slidable rearward from the bulkhead to the deployed position.

7. The vehicle of claim 6, further comprising a first lock configured to maintain the second member at the deployed position and a second lock configured to maintain the first member at the deployed position.

8. The vehicle of claim 1, wherein the airbag in the inflated position is spaced from the bulkhead with the telescoping member at the deployed position.

9. The vehicle of claim 1, further comprising a tether extending from the airbag to the bulkhead.

10. The vehicle of claim 1, wherein the bulkhead includes an instrument panel.

11. The vehicle of claim 1, further comprising a pyrotechnic material that moves the telescoping member to the deployed position upon actuation.

12. The vehicle of claim 1, further comprising a second airbag inflatable to a second inflated position, the second airbag in the second inflated position being below the airbag in the inflated position.

13. The vehicle of claim 12, wherein the airbag is in fluid communication with the second airbag to permit inflation medium to flow from the airbag to the second airbag.

14. The vehicle of claim 12, wherein the second airbag extends from the airbag toward the bulkhead.

15. The vehicle of claim 12, further comprising a tether extending from the second airbag to the bulkhead.

16. The vehicle of claim 1, wherein the instructions include instructions to inflate the airbag a threshold amount of time after moving the telescoping member to the deployed position.

17. A vehicle, comprising:
a body defining a passenger cabin with a front end, the body having a bulkhead at the front end of the passenger cabin;
a telescoping member supported by the bulkhead and movable from a stowed position to a deployed position;
an airbag supported by the telescoping member and movable from the stowed position to the deployed position, the airbag inflatable from an uninflated position to an inflated position; and
a tether extending from the airbag to the bulkhead.

18. A vehicle, comprising:
a body defining a passenger cabin with a front end, the body having a bulkhead at the front end of the passenger cabin;
a telescoping member supported by the bulkhead and movable from a stowed position to a deployed position;
an airbag supported by the telescoping member and movable from the stowed position to the deployed position, the airbag inflatable from an uninflated position to an inflated position; and
a second airbag inflatable to a second inflated position, the second airbag in the second inflated position being below the airbag in the inflated position.

19. The vehicle of claim 18, wherein the airbag is in fluid communication with the second airbag to permit inflation medium to flow from the airbag to the second airbag.

20. The vehicle of claim 18, wherein the second airbag extends from the airbag toward the bulkhead.

* * * * *